(12) United States Patent
Stachow et al.

(10) Patent No.: US 8,099,994 B2
(45) Date of Patent: Jan. 24, 2012

(54) SYSTEMS AND METHODS FOR CALIBRATING TRIAXIAL ACCELEROMETERS

(75) Inventors: Robert Stachow, Carson City, NV (US); Mark Allen Woodmansee, Minden, NV (US); Jeff Ham, Pearland, TX (US); David Sevey, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 506 days.

(21) Appl. No.: 12/040,511

(22) Filed: Feb. 29, 2008

(65) Prior Publication Data
US 2009/0217733 A1    Sep. 3, 2009

(51) Int. Cl.
*G01P 21/00* (2006.01)
*G01C 19/00* (2006.01)
(52) U.S. Cl. .......................................... 73/1.37; 702/104
(58) Field of Classification Search .................. 73/1.37; 702/94, 95, 105, 141
See application file for complete search history.

(56) References Cited

U.S. PATENT DOCUMENTS

| | | | |
|---|---|---|---|
| 5,633,800 A * | 5/1997 | Bankert et al. | 700/177 |
| 6,643,597 B1 * | 11/2003 | Dunsmore | 702/104 |
| 7,437,255 B2 * | 10/2008 | Woodmansee et al. | 702/95 |
| 7,467,536 B2 * | 12/2008 | Finley et al. | 73/1.38 |

* cited by examiner

*Primary Examiner* — Hezron E Williams
*Assistant Examiner* — Tamiko Bellamy
(74) *Attorney, Agent, or Firm* — Sutherland Asbill & Brennan LLP (57) ABSTRACT

A method for calibrating a multiple-triad triaxial accelerometer is provided. The method may include receiving accelerometer measured output from a first measurement triad and at least one additional measurement triad of the accelerometer. The method may further include aligning the output of a x, y, and z components of the first measurement triad to be substantially orthogonal with respect to each other, aligning the output of x, y, and z components of at least one additional measurement triad to be substantially orthogonal with respect to each other, and rotating the output of at least one measurement triad so the outputs of all measurement triads substantially align with each other. The method may further include storing the result of the alignment and rotation associated with at least one calibration function associated with the multiple-triad triaxial accelerometer. The alignment and rotation may be performed substantially simultaneously.

20 Claims, 3 Drawing Sheets

SYSTEMS AND METHODS FOR CALIBRATING TRIAXIAL ACCELEROMETERS

FIELD OF THE INVENTION

The invention relates to accelerometers, and more particularly, to systems and methods for calibrating triaxial accelerometers.

BACKGROUND OF THE INVENTION

Generally, triaxial accelerometers produce output signals related to acceleration sensed in three linearly independent directions. More specifically, the triaxial accelerometer may include stress sensor elements intended to align with each of the three Cartesian coordinate axes. Thus, relative to each other, each stress sensor element may be configured to align in the x-axis, in the y-axis, and in the z-axis, respectively. The stress sensor elements may include force sensitive resonators, strain gauges, or the like, to allow measuring an output related to a change in position, a change in the load, or the like, of the inertial proof mass or other structure. The axial related output in an accelerometer (in three directions) may be referred to as a triad or a measurement triad.

Some triaxial accelerometers may include two or more sensor elements in one or more axial direction (i.e., two sensor elements in one or more of the three axes). Thus, a triaxial accelerometer having, for example, two sensor elements in each orthogonal direction includes two measurement triads. Alternatively, for a device having asymmetric construction, (i.e., having unequal numbers of sensor elements in each direction) additional measurement triads may be defined mathematically by including the output of some of the sensor elements in more than one measurement triad. Thus, a triaxial accelerometer having, for example, two sensor elements in only one direction and single sensor elements in each of the remaining directions, two complete measurement triads may be defined by including the single sensor elements in the definitions of both measurement triads.

However, the measurement triad output is often calibrated to minimize error between the output recorded and the actual acceleration applied to the accelerometer. The errors may be the result of variances in the construction of the sensor elements, such as strain gauge variances or variances in the composition or output of individual force sensitive resonators. Errors may also result from an inexact orientation of each sensor element in relation to the others and to the axes along which they are intended to be oriented. Accordingly, calibration operations may include identifying a correction term or terms (e.g., calibration constants or correction constants) to apply to the measurement triads, so as to generate meaningful output that can be used to make determinations and measurements relational to, for example, a gravity field or other known vector.

Traditionally, for accelerometers having more than one measurement triad, calibration optimizations are performed individually for each triad, and then the outputs of the individually-calibrated triads are averaged to produce the output of the accelerometer. However, averaging these individually-calibrated outputs may not produce the most accurate results. Additionally, to correct for misalignment or inexact alignment of the individual sensor elements, these traditional methods do not simultaneously optimize, in one step, the outputs for situations in which the sensor elements of a triad may not necessarily be orthogonal with respect to other sensor elements of the triad, and/or the independent Cartesian coordinate system suggested by each individually-calibrated triad may not align with one another. Thus, performing individual alignment calibrations and rotation transformation in separate steps may yield inaccuracies.

Thus, there exists a need to for systems and methods for calibrating triaxial accelerometers.

BRIEF DESCRIPTION OF THE INVENTION

Embodiments of the invention can address some or all of the needs described above. Embodiments of the invention are directed generally to systems and methods for calibrating triaxial accelerometers.

According to one exemplary embodiment of the invention, a method for calibrating a multiple-triad triaxial accelerometer is provided. This example method may include defining an objective function that includes one or more unknown calibration constants, and where the objective function accounts for at least alignment and rotation. The method may further include receiving accelerometer measured output for at least as many distinct positions as there are unknown calibration constants, and determining initial approximations for each of the unknown calibration constants. The method may additionally include optimizing output from the objective function, extracting one or more optimized calibration constants resulting from the optimization, and storing one or more of the optimized calibration constants associated with at least one calibration function in a controller associated with the multiple-triad triaxial accelerometer.

According to another exemplary embodiment of the invention, a system for calibrating a multiple-triad triaxial accelerometer is provided. This example system may include a controller that is operable to store an objective function comprising one or more unknown calibration constants, where the objective function accounts for at least alignment and rotation. The controller of the system may further be operable to receive accelerometer measured output in at least as many distinct positions as there are unknown calibration constants and to determine initial approximations for each of the unknown calibration constants. The controller may additionally be operable to optimize output from the objective function, to extract optimized calibration constants resulting from the optimization, and to store the optimized calibration constants associated with at least one calibration function in the controller.

According to yet another exemplary embodiment of the invention, a method for calibrating a multiple-triad triaxial accelerometer is provided. This example method may include receiving accelerometer measured output from a first measurement triad and at least one additional measurement triad of the multiple-triad triaxial accelerometer. The method may further include aligning the output of a first x component, a first y component, and a first z component of the first measurement triad to be substantially orthogonal with respect to each other, aligning the output of at least one additional x component, at least one additional y component, and at least one additional z component of the at least one additional measurement triad to be substantially orthogonal with respect to each other, and rotating the output of at least one measurement triad so the outputs of all measurement triads substantially align with each other. The example method may further include storing the result of the alignment and rotation associated with at least one calibration function associated with the multiple-triad triaxial accelerometer. The alignment and rotation may be performed substantially simultaneously.

Other embodiments and aspects of the invention will become apparent from the following description taken in conjunction with the following drawings.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

As used herein, the term "optimization" refers to the process of mathematical optimization, whereby the solution of at least one equation or at least one function (in some examples referred to as an objective function, as further described below) may be systematically solved in an effort to minimize or maximize (also referred to as "optimize") the output of the equation or function. An "optimization" may be performed systematically or iteratively to solve for values of variables in the equation or function. It is appreciated that the term "optimization" is not intended to be limited to derive an absolute maximum solution or an absolute minimum solution, but may refer to the mathematical process of moving toward acceptable results. It is further appreciated that the term "optimum" refers to a condition, resulting from a mathematical optimization that meets system requirements. More specifically, for example, an "optimum" set of calibration constants (as further described below) may be obtained when the measurement error of the accelerometer falls below some threshold, not necessarily when no smaller error is possible. This threshold is not absolute, but may be determined by any number of ways, including, for example, customer requirements, system application or use, internal specifications, industry standards, or the like. Furthermore, the threshold by which an "optimum" is defined may be influenced by resource constraints such as available computing power and the convergence time of the optimization algorithm (also described in more detail below). Accordingly, an "optimization" or to "optimize" refers to the actions and sequences (as are more fully described in detail below) by which an "optimum" is obtained.

The invention now will be described more fully hereinafter with reference to the accompanying drawings, in which example embodiments of the invention are shown. This invention may, however, be embodied in many different forms and should not be construed as limited to the example embodiments set forth herein; rather, these embodiments are provided so that this disclosure will satisfy applicable legal requirements. Like numbers refer to like elements throughout.

Embodiments of the invention provide systems and methods for simultaneously calibrating and aligning multiple measurement triads in multiple-triad triaxial accelerometers. A calibration process according to an embodiment of the invention can optimize a set of calibration constants that may be applied to the accelerometer measured output from each measurement triad to convert the measured output into a calibrated output expressed in meaningful engineering units and values. The calibration constants may be determined by way of optimization or mathematical programming of a chosen objective function, so as to optimize the chosen objective function. The objective function may be an equation or mathematical representation that allows determining one or more values of variables within the objective function, by way of performing mathematical optimization (e.g., minimization or maximization) of the objective function. The objective function may be chosen based at least in part on the available data (e.g., the measured output from the accelerometer), the intended operations to be performed on the measured output to arrive at the calibrated output (e.g., scaling, weighting, aligning, rotating, unit conversion), the relative importance of various parameters of the accelerometer output (e.g., the importance of triad alignment, individual triad accuracy, averaged output accuracy), or the like. For example, scaling may include adjusting the output to produce useful magnitudes and to perform unit conversion. Weighting may include adjusting the output to emphasize or deemphasize certain output measurements. Scaling, weighting, and unit conversion may be referred to together as scaling. Aligning may include aligning the output of one or more individual axes components of a measurement triad so the output are substantially orthogonal with respect to each other. Rotation may include rotating the output of one or more measurement triads so the output from all of the measurement triads substantially align with each other. The optimization may include measuring output from the accelerometer for at least one unique position for each unknown calibration constant. Then, beginning with initial approximations or estimates (also referred to herein as initial best guesses) for each of the unknown calibration constants, an optimization algorithm may be applied to the objective function to numerically determine the optimum set of calibration constants. The optimized calibration constants extracted from the optimized objective function may be stored as one or more calibration functions in a processor associated with the accelerometer. During operation of the accelerometer, the measured output of the accelerometer may be operated on, at least partially, by the calibration function so as to convert the measured output into calibrated output representing meaningful engineering values and units.

Example embodiments of the invention can perform or otherwise facilitate certain technical effects including, but not limited to, scaling, aligning, and rotating output measured by a multiple-triad triaxial accelerometer. Performing scaling, alignment, and rotation simultaneously may have the technical effect of allowing for more efficient and more accurate calibration, by way of optimizing calibration constants, of the output into meaningful engineering values and units from a multiple-triad triaxial accelerometer. Additionally, the example embodiments of the invention may have the technical effect of generating one or more calibration functions incorporating the optimized calibration constants that may be used during use of the multiple-triad triaxial accelerometer.

Figure 1:
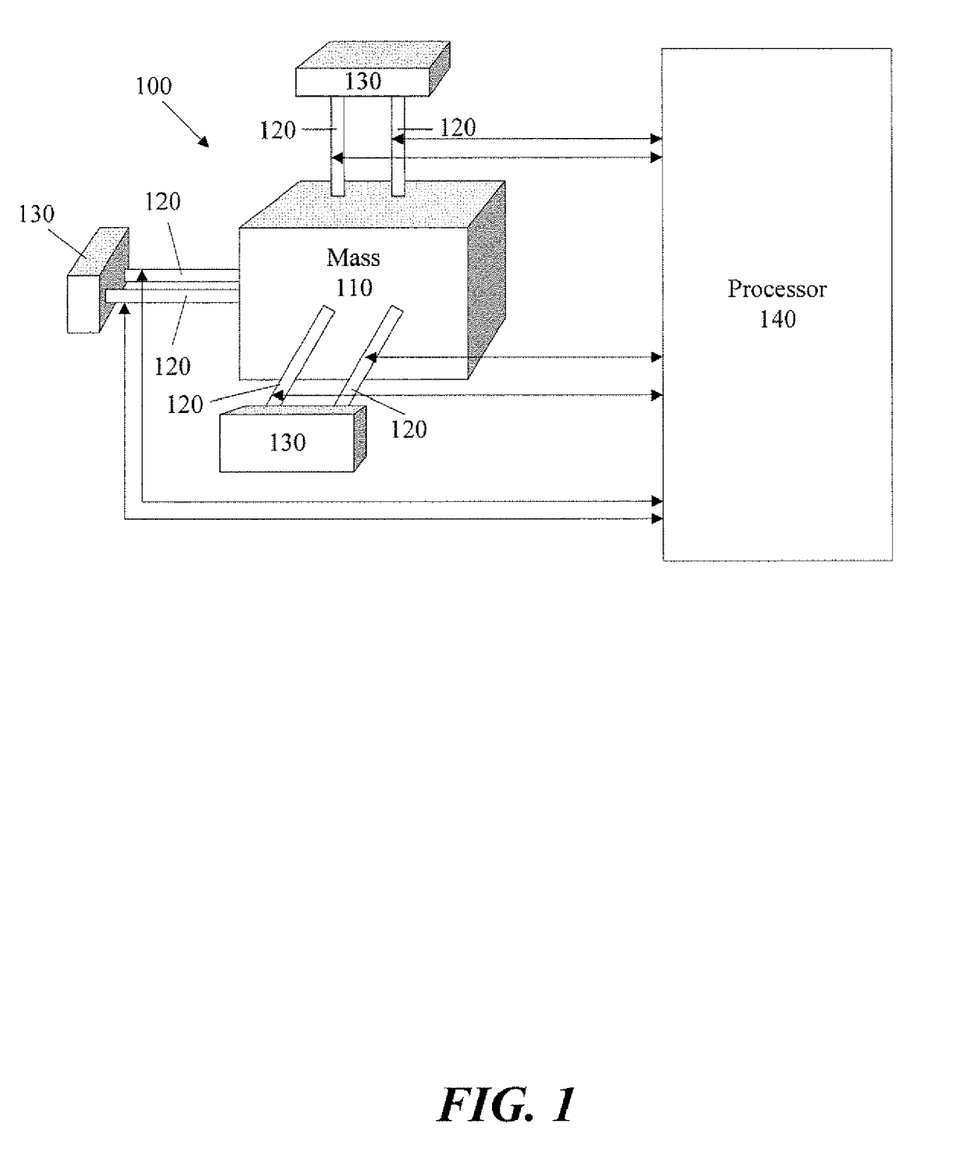
FIG. 1 illustrates an example functional block diagram representing a triaxial accelerometer according to one embodiment of the invention.

FIG. 1 illustrates an example embodiment of a triaxial accelerometer for use with an embodiment of the invention. The triaxial accelerometer 100 in this example includes an inertial proof mass 110 and two sensor elements 120 attaching the inertial proof mass 110 to a frame 130 in the direction of each of the three Cartesian axes (x, y, and z). Each sensor elements 120 may be affected by movement of the inertial proof mass 110 and, thus, allows for measuring movement of the inertial proof mass 110. The sensor elements 120 may be force sensitive resonators, strain gauges, or the like, which generate an output responsive to movement of, stress on, and/or a strain on the stress sensor elements. Accordingly, the example triaxial accelerometer illustrated by FIG. 1 provides two measurement triads, each having a measurement output in the x direction, the y direction, and the z direction. In one example embodiment the individual stress sensor elements may measure output in opposite directions along the same axes (e.g., a positive x-axis and a negative x-axis, a positive y-axis and a negative y-axis, and a positive z-axis and a negative z-axis).

The example triaxial accelerometer 100 illustrated by FIG. 1 also includes a controller 140. The controller 140 may be a computer device, which is more fully described with reference to FIG. 2. The controller 140 may be in electrical communication with the stress sensor elements 120, allowing for measuring the output from the stress sensor elements of the accelerometer. The accelerometer measured output may be stored in memory and/or it may be directly operated on by the programmed logic controller 140. The controller 140 may perform some or all of the optimization routines, as is described more fully with respect to FIG. 3. However, in other example embodiments, the controller 140 may apply the optimized calibrated constants to the measured outputs of the triaxial accelerometer during use of the accelerometer, while another computer processing unit performs the calibration techniques and optimization routines, as is more fully described with respect to FIG. 3. It is appreciated that the controller 140, while illustrated as integrated with the triaxial accelerometer 100, may be located at a location remote from the triaxial accelerometer, while still being in electrical communication with the stress sensor elements 120. Furthermore, the controller 140 may be configured as multiple computer processing units, where the multiple computer processing units may each perform portions of the controller 140 operations, or where the multiple computer processing units may be configured in a redundant configuration, each performing the some or all of the same controller 140 operations.

Figure 2:
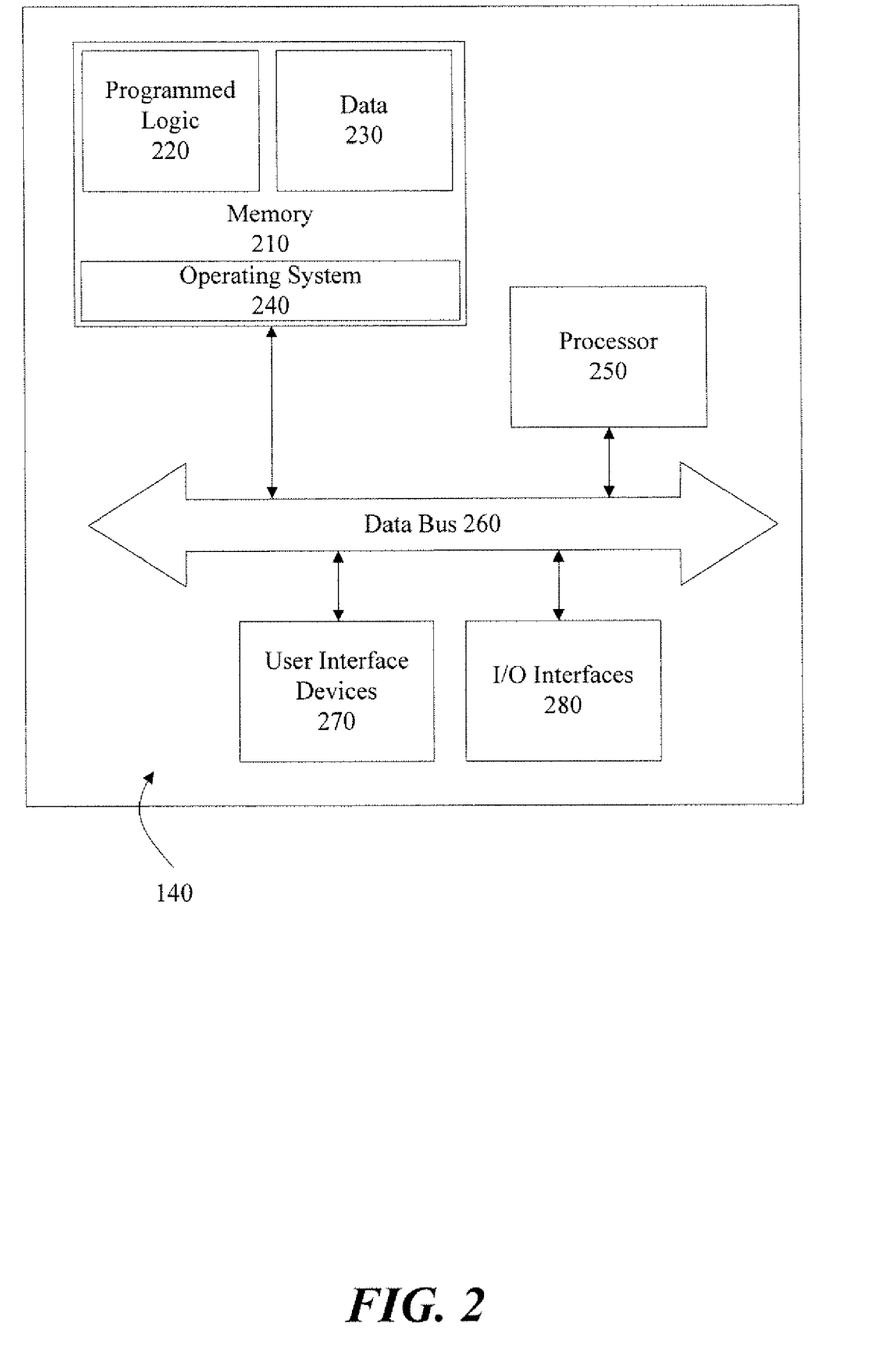
FIG. 2 illustrates an example functional block diagram representing a processor for carrying out some or all of the methods according to one embodiment of the invention.

FIG. 2 illustrates by way of a block diagram an example controller 140 in electrical communication with the stress sensors 120, and used to perform at least some of the calibration techniques, more fully described with reference to FIG. 3. More specifically, one or more of the controller 140 may carry out the calibration techniques, including, but not limited to, performing measurements of the stress sensors at multiple unique positions, performing optimization of the objective function, and/or storing the optimized calibration constants as one or more calibration functions. The controller 140 may include a memory 210 that stores programmed logic 220, for example the software that performs at least some of the application code conversion steps described below, and may store data 230, such as application code source files, configuration files, data dictionaries, extracted application code, generated application data, or the like. The memory 210 also may include an operating system 240. A processor 250 may utilize the operating system 240 to execute the programmed logic 220, and in doing so, also may utilize the data 230. A data bus 260 may provide communication between the memory 110 and the processor 250. Users may interface with the controller 140 via a user interface device(s) 270 such as a keyboard, mouse, control panel, or any other devices capable of communicating data to and from the controller 140. The controller 140 may be in communication with other accelerometer components, and other system components being used in conjunction with the triaxial accelerometer 100, or other systems on a network, via an I/O Interface 280.

The controller 140 may be located remotely with respect to the accelerometer 100; although, it may be co-located or even integrated with the accelerometer 100. Further the controller 140 and the programmed logic 220 implemented thereby may include software, hardware, firmware, or any combination thereof. It should also be appreciated that multiple controllers 140 may be used, whereby different features described herein may be executed on one or more different controller 140. However, for simplicity, the controller 140 will be referred to as a single component, though it is appreciated that it may be more than one computer processor and/or more than one software application directed to different functions.

Figure 3:
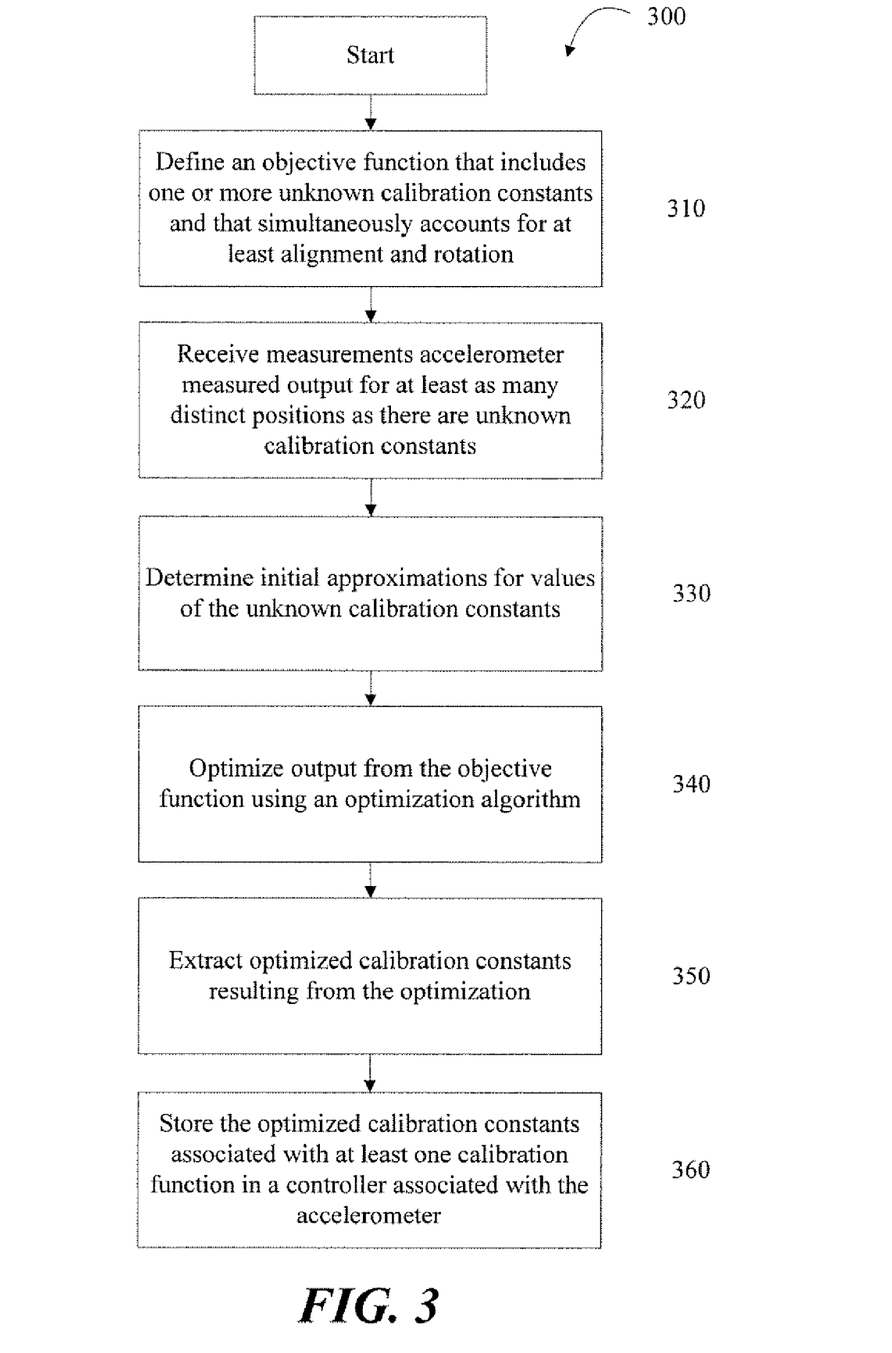
FIG. 3 illustrates an example flowchart of a method for simultaneously calibrating and aligning multiple measurement triads in triaxial accelerometers according to one embodiment of the invention.

FIG. 3 illustrates an example method 300 by which an embodiment of the invention may operate. Provided is a flowchart illustrating an example operation of the simultaneous rotation and alignment technique as executed, at least partially, by the controller, such as the controller 140 in FIG. 1. The method 300 includes determining an objective function, and then subsequently performing an optimization of the objective function to optimize the output of the objective function, resulting in a set of calibration constants that can be applied to the measured output from the triaxial accelerometer, such as the accelerometer 100 in FIG. 1, to convert the accelerometer output into useful engineering units and values.

At block 310, an objective function may be defined that represents the desired output behavior for an accelerometer producing at least two measurement triads. The objective function as implemented by this invention may simultaneously, or substantially simultaneously, calibrate, scale, rotate, align, or substantially align the calibration constants for multiple measurement triads by way of a single optimization. It is appreciated that optimization may, in some examples, include multiple objective programming. Various factors may be considered to determine the objective function. The objective function may be chosen based on the available data (e.g., the measured output from the accelerometer), the intended operations to be performed on the measured output to arrive at the calibrated output (e.g., scaling, weighting, aligning, rotating, unit conversion), the relative importance of various parameters of the accelerometer output (e.g., the importance of triad alignment, individual triad accuracy, averaged output accuracy), or the like. In example embodiments, the objective function may include, but is not limited to, components that account for scaling the measured accelerometer output, aligning the individual axis components of each measurement triad with the axes for which they are intended to represent and resulting in an orthogonal triad, and rotating one or more of the measurement triad orientations to represent a coordinate system that aligns with all other measurement triads.

It is appreciated that the rotation and the alignment components may be determined in a substantially simultaneous manner by the algorithm selected to optimize the chosen objective function or functions, whereby the term "substantially simultaneous" is intended to mean that the optimization produces at least one solution for both sets of terms. It is further appreciated that the rotation and alignment performed may result in outputs that are substantially aligned and/or substantially orthogonal, whereby the terms "substantially aligned" or "substantially orthogonal" are intended to mean that the outputs are aligned and/or orthogonal within acceptable ranges, depending upon the intended use of the system, allowable error, or the like. In some examples, acceptable error may allow for substantial alignment to occur when orthogonality or triad alignment is within 0 to 0.5 radians. In other examples, acceptable error may only allow for substantial alignment to occur when orthogonality or triad alignment is within 0 to 0.01 radians. Though, these ranges are intended to be non-limiting examples, and the orthogonality and triad alignment may be considered to be substantially aligned when greater angle of rotation exist between the components, depending upon the intended use and allowable error in the system and/or output.

In one example embodiment, the objective function is the sum of the squared error between a measured or calculated vector magnitude and a known value as shown in the following equation:

$$Q = \sum_{i=1}^{4N} \left(F_{ci} - \vec{F}_i^2\right)^2$$

The $F_{ci}$ constants and the $\vec{F}_i$ vectors are blocks within larger partitioned matrices.

The force data matrix [F] may be represented by the following equation:

$$F = [F_1 F_2 F_{avg} F_{sum}]$$

The force data matrix [F] of this example objective function includes vectors that represent the accelerometer measured outputs from each of the measurement triads (also referred to herein as output vectors, such as a first output vector and a second output vector), vectors that represent the average of the calibrated outputs (also referred to herein as an average output vector), and vectors that represent the sum of the calibrated outputs for each calibration data point (also referred to herein as a summed output vector). The blocks within force data matrix [F] may be defined as (where N represents the number of individual data points utilized in the calibration):

$$F_1 = [\vec{F}_{1,1} \vec{F}_{1,2} \vec{F}_{1,3} \ldots \vec{F}_{1,N}]$$

$$F_2 = [\vec{F}_{2,1} \vec{F}_{2,2} \vec{F}_{2,3} \ldots \vec{F}_{2,N}]$$

$$F_{avg} = [\vec{F}_{avg,1} \vec{F}_{avg,2} \vec{F}_{avg,3} \ldots \vec{F}_{avg,N}]$$

$$F_{sum} = [\vec{F}_{sum,1} \vec{F}_{sum,2} \vec{F}_{sum,3} \ldots \vec{F}_{sum,N}]$$

For this example objective function, the constants, $F_{ci}$, representing the true magnitudes of the $F_1$, $F_2$, $F_{avg}$, and $F_{sum}$ vectors may be defined as:

$$F_{ci} = \begin{cases} 1 & i = 1 \ldots 3N \\ 0 & i = 3N+1 \ldots 4N \end{cases}$$

The $\vec{F}_1$ and $\vec{F}_2$ vectors, representing the individual measurement triad outputs, may be represented by the following matrix equation:

$$\vec{F} = \begin{bmatrix} 1 & m_{xy} & m_{xz} \\ m_{xy} & 1 & m_{yz} \\ m_{xz} & m_{yz} & 1 \end{bmatrix} \begin{bmatrix} S_x & 0 & 0 \\ 0 & S_y & 0 \\ 0 & 0 & S_z \end{bmatrix} \begin{Bmatrix} f_x(\tau_x, \ldots) \\ f_y(\tau_y, \ldots) \\ f_z(\tau_z, \ldots) \end{Bmatrix}$$

The functions $f_x$, $f_y$, and $f_z$ may be functions of one or more unknown constants $\bullet_x$, $\bullet_y$, and $\bullet_z$, as well as one or more outputs of the accelerometer. In this example equation, the functions $f_x$, $f_y$, and $f_z$ are represented generally, allowing for the inclusion of any number of unknown constants to convert the accelerometer outputs into values that may be in linear proportion to the sensed movement or acceleration. For example, the unknown constants $\bullet_x$, $\bullet_y$, and $\bullet_z$ may include a bias term (also referred to herein as a bias component of an example objective function) to shift the measured output, or they may include one or more weighting factors emphasizing or de-emphasizing certain measured output values, or the like. The terms $S_x$, $S_y$, and $S_z$ represent components of a scaling matrix (also referred to herein as a scaling component of an example objective function), which may be included to scale the measured output to the a useful magnitude and unit. The scaling matrix may depend in part on the type of data produced by the measured output, for example, if the stress sensors are strain gauges or stress resonators. Additionally, the scaling matrix may depend in part on the desired output and intended use of the output. The terms $m_{xy}$, $m_{xz}$, and $m_{yz}$ represent alignment terms (also referred to as a misalignment component of an example objective function) that may be used to correct the misalignment of the measured outputs of the individual stress sensor elements with respect to one another. The alignment terms may be included to account for, for example, the case in which the sensor elements mounted between the inertial proof mass and the frame are not mounted in exact orthogonal orientation with respect to each other. The misalignment component of this example is intended to correct the alignment of the individual outputs within a single measurement triad, but do not correct the alignment between multiple triads.

The $\vec{F}_{avg}$ vector, representing the average of the calibrated outputs, may be represented by the following equation:

$$\vec{F}_{avg,ik} = \frac{(\vec{F}_{1ik} - [R]\vec{F}_{2ik})}{2}$$

The subscripts 1 and 2 are used in this equation (and in others that follow) to designate the first or second triad, respectively. It is appreciated that in some example embodiments, there may be more than two measurement triads, and thus there would be subscripts 1, 2, . . . n each representing a measurement triad generated by the triaxial accelerometer configuration. The second subscript i is used in this equation to designate the specific calibration point associated with one of the unique device orientations for which the accelerometer measured output is gathered, as is more fully described below with reference to block 320. The multiple calibration points represented by subscript i are used during optimization of the objective function. There may be at least one calibration point for each unknown calibration constant identified by the objective function. The third subscript k is used in this equation to refer to the iteration number of the optimization algorithm of this example embodiment. However, it may be assumed that the example equations presented herein as components of the objective function and/or the optimization algorithm are valid irrespective of the specific iteration number of the optimization algorithm. Accordingly, some example equations presented herein may omit the subscript k without impacting the outcome of the equation and without impacting the calibration techniques presented herein. Additionally, the $\vec{F}_{avg}$ vector equation may also include a rotation matrix [R] (also referred to herein as a rotation component), which considers the alignment between the two (or more) measurement triads, as more fully described below. The inclusion of both the sum and average terms in this example allow the optimization algorithm to better approximate the required rotation matrix [R]. Inclusion of either term without the other term may produce a solution to the optimization algorithm that best satisfies or otherwise suitably satisfies the objective function without resulting in a physically meaningful calibration.

In some example embodiments of the invention, the average of the calibrated outputs may be the ultimate useful result from the accelerometer output, after calibration and during use. For example, a triaxial accelerometer that is calibrated as described herein may have two sensor elements aligned with each coordinate axis, producing two measurement triads, and the calibrated output that may be used to drive a response in the associated activity may be the average of the two calibrated measurement triad outputs.

The $\vec{F}_{sum}$ vector, used to rotate each measurement triad with respect to each other resulting in all of the measurement triads aligning along the same coordinate directions, may be represented by the following equation:

$$\vec{F}_{sum,ik} = \vec{F}_{1ik} + [R]\vec{F}_{2ik}$$

Similarly to the $\vec{F}_{avg}$ vector equation, the $\vec{F}_{sum}$ vector equation may include a rotation matrix [R] to account for any differences in alignment between the respective measurement triads. In this example embodiment, the $\vec{F}_1$ and $\vec{F}_2$ vectors have opposite signs, because the accelerometer of this example is configured so the output of one triad is in the direction opposite of the other triad output. By assuming that the known field magnitude is zero, and summing the $\vec{F}_1$ and $\vec{F}_2$ vectors (or any other number of vectors), where the second (or others) vector includes an operation by a rotation matrix [R], the optimization will produce the rotation calibration constants of one measurement triad (for example here, the second measurement triad) with respect to the other.

The rotation matrix [R] as applied in both the $\vec{F}_{avg}$ vector equation and the $\vec{F}_{sum}$ vector equation, may be represented as:

$$[R]^T = [R_x][R_y][R_z]$$

The individual rotation matrices $[R_x]$, $[R_y]$, and $[R_z]$ may be represented as:

$$[R_x] = \begin{bmatrix} 1 & 0 & 0 \\ 0 & \cos(\Theta_x) & \sin(\Theta_x) \\ 0 & -\sin(\Theta_x) & \cos(\Theta_x) \end{bmatrix}$$

$$[R_y] = \begin{bmatrix} \cos(\Theta_y) & 0 & \sin(\Theta_y) \\ 0 & 1 & 0 \\ -\sin(\Theta_y) & 0 & \cos(\Theta_y) \end{bmatrix}$$

$$[R_z] = \begin{bmatrix} \cos(\Theta_z) & \sin(\Theta_z) & 0 \\ -\sin(\Theta_z) & \cos(\Theta_z) & 0 \\ 0 & 0 & 1 \end{bmatrix}$$

The individual rotation matrices $[R_x]$, $[R_y]$, and $[R_z]$ as shown above are defined in the usual manner as functions of the angle of rotation, •, about the corresponding axis.

Accordingly, in this example objective function as described by the above equations, a vector of the unknown calibration constants for which the optimization should solve (also referred to as the calibration constant vector) may be represented as:

$$\vec{\alpha} = [S_{x1}, S_{y1}, S_{z1}, \tau_{x1}, \tau_{y1}, \tau_{z1}, m_{xy1}, m_{xz1}, m_{yz1}, S_{x2}, S_{y2}, S_{z2}, \tau_{x2}, \tau_{y2}, \tau_{z2}, m_{xy2}, m_{xz2}, m_{yz2}, \Theta_x, \Theta_y, \Theta_z]^T$$

This example calibration constant vector includes the above mentioned unknown calibration constants for each measurement triad (here, for example, considering two measurement triads), as well as three angles that specify the rotation transformation that will align the measurement triads with each other. It is appreciated that while this calibration constant vector identifies the unknown calibration constants for an objective function of a triaxial accelerometer producing two measurement triads, the above objective function Q may be minimally altered to include more than two measurement triads, and thus the calibration constant vector may include additional unknown calibration constants associated with the additional measurement triads and the relationships between each.

In another example embodiment, the objective function may instead combine the misalignment matrix, the rotation matrix, and the scale matrix, as individually represented in the above $\vec{F}_1$ and $\vec{F}_2$ vectors, into a single alignment matrix, which may be applied to individually align each axis of the second measurement triad (or other measurement triads) with the first measurement triad. For example, this new example alignment matrix may be represented by the following equation:

$$[a] = \begin{bmatrix} a_{xx} & a_{xy} & a_{xz} \\ a_{yx} & a_{yy} & a_{yz} \\ a_{zx} & a_{zy} & a_{zz} \end{bmatrix} = [R] \begin{bmatrix} 1 & -m_{xy} & -m_{xz} \\ -m_{xy} & 1 & -m_{yz} \\ -m_{xz} & -m_{yz} & 1 \end{bmatrix} \begin{bmatrix} S_x & 0 & 0 \\ 0 & S_y & 0 \\ 0 & 0 & S_z \end{bmatrix}$$

By creating the alignment matrix [a] that includes alignment calibration constants $a_{xx}$, $a_{xy}$, $a_{xz}$, $a_{yx}$, $a_{yy}$, $a_{yz}$, $a_{zx}$, $a_{zy}$, $a_{zz}$, and solving by way of optimization, the alignment calibration constants can scale, align, and rotate the measurement triads, resulting in a calibrated accelerometer measured output similar to that as results from the above-discussed first example objective function that includes individual scale, misalignment, and rotation matrices that are simultaneously or substantially simultaneously solved.

Accordingly, in this second example embodiment that includes the alignment matrix [a], the force data matrix may similarly be represented by the equation:

$$F = [F_1 F_2{}^a F_{avg} F_{sum}]$$

Similar to the first example objective function, the $\vec{F}_1$ vector, representing the first measurement triad output, may be represented by the following matrix equation:

$$\vec{F}_1 = \begin{bmatrix} 1 & m_{xy} & m_{xz} \\ m_{xy} & 1 & m_{yz} \\ m_{xz} & m_{yz} & 1 \end{bmatrix} \begin{bmatrix} S_x & 0 & 0 \\ 0 & S_y & 0 \\ 0 & 0 & S_z \end{bmatrix} \begin{Bmatrix} f_x(\tau_x, \ldots) \\ f_y(\tau_y, \ldots) \\ f_z(\tau_z, \ldots) \end{Bmatrix}$$

However, different than the first example objective function, the $\vec{F}_2$ vector, representing the second measurement triad output may be represented by the following matrix equation that includes the alignment vector:

$$\vec{F}_2{}^a = \begin{bmatrix} a_{xx} & a_{xy} & a_{xz} \\ a_{yx} & a_{yy} & a_{yz} \\ a_{zx} & a_{zy} & a_{zz} \end{bmatrix} \begin{Bmatrix} f_x(\tau_x, \ldots) \\ f_y(\tau_y, \ldots) \\ f_z(\tau_z, \ldots) \end{Bmatrix}$$

Accordingly, the $\vec{F}_{avg}$ vector equation and the $\vec{F}_{sum}$ vector equation are modified slightly to account for the inclusion of the new alignment matrix [a] and the absence of the rotation matrix [R], as was included in the first example objective function. The $\vec{F}_{avg}$ vector equation may be represented as:

$$\vec{F}_{avg,i} = \frac{(\vec{F}_{1i} - \vec{F}_{2i}^a)}{2}$$

The $\vec{F}_{sum}$ vector equation may be represented as:

$$\vec{F}_{sum,i} = \vec{F}_{1i} + \vec{F}_{2i}^a$$

The extended calibration constant vector for the second example objective function no longer includes scale or misalignment calibration constants associated with the second (or others) measurement triad. Additionally, instead of rotation calibration constants associated with the second measurement triad, the extended calibration constant vector for the second example includes alignment calibration constants $a_{xx}$, $a_{xy}$, $a_{xz}$, $a_{yx}$, $a_{yy}$, $a_{yz}$, $a_{zx}$, $a_{zy}$, $a_{zz}$, which when optimized, effectively align, scale, and rotate the second measurement triad with respect to the first measurement triad. The extended calibration constant vector may be represented as follows:

$$\vec{\alpha} = [S_{x1}, S_{y1}, S_{z1}, \tau_{x1}, \tau_{y1}, \tau_{z1}, m_{xy1}, m_{xz1}, m_{yz1}, \tau_{x2}, \tau_{y2}, \tau_{z2}, a_{xx}, a_{xy}, a_{xz}, a_{yx}, a_{yy}, a_{yz}, a_{zx}, a_{zy}, a_{zz}]^T$$

It is appreciated that the above two example objective functions, as defined at block 310, are provided for example purposes, illustrating the varying factors that may be considered when determining the objective function so as to define a set of unknown calibration constants for optimization.

Again with reference to FIG. 3, block 310 is followed by block 320, in which measurements are performed from the accelerometer at multiple distinct positions. The measured output from the accelerometer performed at block 320 is used during the iterative optimization methods, described below in more detail with reference to block 340. Thus, measurements from the accelerometer may be made for at least as many distinct locations as there are unknown calibration constants. For example, for both the first and the second example objective functions described above, the extended calibration constant vectors may each include about twenty-one variables. Thus, when performing an optimization using either of these example objective functions, at least twenty-one measurements may be taken from the accelerometer at unique positions. However, it is appreciated that more measurements may be taken at unique positions than there are unknown calibration constants. Additional measurements may increase the accuracy by which the calibration coefficients describe the true function of the accelerometer. Using exactly the same number of measurements as unknown calibration constants will allow the optimization algorithm to exactly fit the measured data, resulting in a 'perfect' calibration, no matter how poor the data from the accelerometer may be. Accordingly, having many more data points than unknown calibration constants, for example as many as two times or three times, ensures that the calibration is not simply fitting random error.

Following block 320 is block 330, in which initial approximations for each of the unknown calibration constants are determined and applied as a starting point for the iterative optimization methods. These initial approximations may be based at least in part on other known methods, such as those which can individually calibrate each measurement triad. In another instance, the initial approximations may be based at least in part on historical calibration data for similarly configured triaxial accelerometers. For example, previous calibrations performed on other triaxial accelerometers manufactured in the same manner and/or by the same manufacturer may have resulted in similar calibration constants to the current triaxial accelerometer under calibration by the method 300. Another starting point for initial approximations may be to begin with the assumption that the individual measurement triads are aligned, that no rotating is necessary, and that only scaling calibration constants are to be resolved. While this may or may not be the case in any individual triaxial accelerometer under calibration by the method 300, using these assumptions as initial approximations will allow the optimization methods to determine optimized values for all of the calibration constants. Accordingly, there may be many ways to arrive at initial approximations for each of the calibration constants, and the iterative nature of the optimization methods of embodiments of this invention will optimize the objective function so as to arrive at optimized calibration constants. However, optimization methods as described herein typically are more efficient and more accurate when the initial approximations are at least somewhat representative of the final optimized outcomes.

Following block 330 is block 340, in which the iterative optimization is performed on the objective function chosen in block 310. The iterative optimization is performed to optimize objective function output, minimizing the error between the accelerometer output and some known forcing function, such as gravity. It is appreciated that optimization methods, also known as mathematical programming, may use different optimization algorithms for optimizing the chosen objective function and numerically determining the optimum set of calibration constants. As discussed above, an "optimum" set of calibration constants (as further described below) may be obtained when the measurement error of the accelerometer falls below some threshold, not necessarily when no smaller error is possible. This threshold is not absolute, but may be determined by any number of means, including, for example, customer requirements, system application or use, internal specifications, industry standards, or the like. Furthermore, the threshold by which an "optimum" is defined may be influenced by resource constraints such as available computing power and the convergence time of the optimization algorithm.

In one example embodiment, a linearized least squares method may be used as the optimization algorithm in block 340. The linearized least squares method may begin, for example, with the following linear representation of the objective function chosen:

$$H \cdot \delta \vec{\alpha} = \vec{R}$$

The matrix [H] represents the partial derivatives of the measured output with respect to the unknown calibration constants. Thus, the matrix [H] may be a n×n matrix, where n represents the number of unknown calibration constants, for example, as indicated by the extended calibration constant vector of the objective function. The matrix [H] can be calculated using the following equation:

$$h_{lm} = \sum_i \left( \vec{F}_{ik} \cdot \frac{\partial \vec{F}_{ik}}{\partial \alpha_l} \right) \left( \vec{F}_{ik} \cdot \frac{\partial \vec{F}_{ik}}{\partial \alpha_m} \right)$$

The residual vector R is related to the difference between the known forcing function (e.g., gravity) and the calculated output as determined either by the initial approximation, or during subsequent iterations optimizing the initial approximation beginning points. The residual vector R may be calculated using the following equation:

$$R_l = \frac{1}{2}\sum_i \left(F^2 - \vec{F}_{ik}^2\right)\left(\vec{F}_{ik} \cdot \frac{\partial \vec{F}_{ik}}{\partial \alpha_l}\right)$$

When solving the matrix H and the residual vector R, the $F_{ik}$ vector in the above equations is an element of the force data matrix, for example, as described above in the first or the second example objective functions with reference to block 310, which may be represented as follows:

$$F=[F_1 F_2 F_{avg} F_{sum}]$$

Thus, the partial derivatives of the first output vector $\vec{F}_1$ and the second output vector $\vec{F}_2$ objective function components, representing the first and the second measurement triad measured outputs, respectively, with respect to the respective extended calibration constant vector, may be solved. Additionally, the partial derivatives of the average output vector $\vec{F}_{avg}$, representing the average of the first and the second measurement triad measured outputs, with respect to the respective extended calibration constant vector, may be solved. The partial derivatives of the summed output vector $\vec{F}_{sum}$, representing the difference between the first and the second measurement triad measured outputs, with respect to the respective extended calibration constant vector may also be solved. It is appreciated that the first or the second example objective functions and the individual components of the objective function are for example purposes, and that the objective function may be represented differently and still be within the scope of this invention.

Solving the linear representation of the objective function with the calculated matrix [H] and the calculated residual vector R may allow the extended calibration constant vector $\vec{\alpha}$, as described more fully with reference to block 310 above, to be updated in an iterative process until the results converge. The following equation may be used to update the extended calibration constant vector $\vec{\alpha}$:

$$\vec{\alpha}_{k+1}=\vec{\alpha}_k+\delta\vec{\alpha}_k$$

Iteratively solving the above linear representation of the objective function, as described using the constituent component equations, performs the optimization at block 340. Accordingly, optimum values for each of the unknown calibration constants in the extended calibration constant vector may be numerically determined through this linearized least squares optimization algorithm. The iterative process may continue until the del alpha vector $\vec{\alpha}$ is sufficiently minimized with respect to the calibration standards or requirements for the accelerometer's use.

It is appreciated that a linearized least squares optimization algorithm is provided as an illustrative example optimization algorithm, and that many other optimization algorithms and optimization techniques may be used to optimize the chosen objective function in block 340.

Block 350 follows block 340, in which the optimized calibration constants resulting from the optimization methods as described in the preceding blocks are extracted for further use in association with the triaxial accelerometer output. For example, if using the first example objective function described with reference to block 310, the optimized calibration constants are determined for each of $S_{x1}$, $S_{y1}$, $S_{z1}$, $\bullet_{x1}$, $\bullet_{y1}$, $\bullet_{z1}$, $m_{xy1}$, $m_{xz1}$, $m_{yz1}$, $S_{x2}$, $S_{y2}$, $S_{z2}$, $\bullet_{x2}$, $\bullet_{y2}$, $\bullet_{z2}$, $m_{xy2}$, $m_{xz2}$, $m_{yz2}$, $\bullet_x$, $\bullet_y$, $\bullet_z$. Alternatively, if using the second example objective function described, the optimized calibration constants are determined for each of $S_{x1}$, $S_{y1}$, $S_{z1}$, $\bullet_{x1}$, $\bullet_{y1}$, $\bullet_{z1}$, $m_{xy1}$, $m_{xz1}$, $m_{yz1}$, $\bullet_{x2}$, $\bullet_{y2}$, $\bullet_{z2}$, $a_{xx}$, $a_{xy}$, $a_{xz}$, $a_{yx}$, $a_{yy}$, $a_{yz}$, $a_{zx}$, $a_{zy}$, $a_{zz}$.

Following block 350 is block 360, in which the extracted optimized calibration constants may be stored in a controller associated with the triaxial accelerometer, such as the controller 140 in FIG. 1. The extracted optimized calibration constants from block 350 may be stored as one or more calibration functions in the memory of the controller, which may be applied to the measured output from the accelerometer during use. Applying the optimized calibration constants to the measured output will adjust the measured output values into meaningful, useful, engineering units and values (also referred to calibrated output) for further processing or use. For example, the controller after measuring the outputs directly from each of the stress sensor elements may adjust the measured outputs so as to scale the measured output, convert the measured output to the applicable engineering units, align individual components of each of the measurement triads to be orthogonal with respect to each other, and rotate the measurement triads to align them along the same orthogonal axes. The calibration functions may be mathematical expressions which may be used to operate on the measured accelerometer output, they may be stored as values or as entries in a look-up table or a look-up function, or they may be implemented in hardware or firmware.

In some example embodiments, the calibrated output may be used to aid in navigation, by providing a position vector of a device associated with the triaxial accelerometer with respect to a known vector, such as gravity. In other example embodiments, the calibrated output may be used to sense movement of a device associated with the accelerometer. It is appreciated that these example uses of the triaxial accelerometer's output are not meant to limit the scope of the invention. Other uses for a triaxial accelerometer calibrated by methods of embodiments of this invention, for example method 300, are still within the scope of this invention.

References are made herein to block diagrams of systems, methods, apparatuses, and computer program products according to example embodiments of the invention. It will be understood that at least some of the blocks of the block diagrams, and combinations of blocks in the block diagrams, respectively, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational elements to be performed on the computer or other programmable apparatus to produce a computer implemented process such that the instructions that execute on the computer or other programmable apparatus provide elements for implementing the functions specified in the block or blocks.

One or more components of the systems and one or more elements of the methods described herein may be implemented through an application program running on an operating system of a computer. They also may be practiced with other computer system configurations, including hand-held devices, multiprocessor systems, microprocessor based, or programmable consumer electronics, mini-computers, mainframe computers, etc.

Application programs that are components of the systems and methods described herein may include routines, programs, components, data structures, etc. that implement certain abstract data types and perform certain tasks or actions. In a distributed computing environment, the application program (in whole or in part) may be located in local memory, or in other storage. In addition, or in the alternative, the application program (in whole or in part) may be located in remote memory or in storage to allow for circumstances where tasks are performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated the invention may be embodied in many forms and should not be limited to the example embodiments described above. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. A method for calibrating a multiple-triad triaxial accelerometer, comprising:
    defining an objective function comprising one or more unknown calibration constants, wherein the objective function accounts for at least alignment and rotation;
    receiving accelerometer measured output for at least as many distinct positions as there are unknown calibration constants;
    determining initial approximations for each of the unknown calibration constants;
    optimizing output from the objective function, wherein alignment and rotation of at least two measurement triads are determined substantially simultaneously;
    extracting one or more optimized calibration constants resulting from the optimization; and
    storing the one or more optimized calibration constants associated with at least one calibration function in a controller associated with the multiple-triad triaxial accelerometer.

2. The method of claim 1, wherein:
    the multiple-triad triaxial accelerometer comprises a first measurement triad and a second measurement triad; and
    the objective function comprises a first output vector associated with the output of the first measurement triad, a second output vector associated with the output of the second measurement triad, an average output vector associated with the average of the output of the first measurement triad and the second measurement triad, and a summed output vector associated with the sum of the output of the first measurement triad and the second measurement triad.

3. The method of claim 1, wherein:
    the multiple-triad triaxial accelerometer comprises a first measurement triad and a second measurement triad; and
    the objective function comprises a rotation component associated with the alignment of the output of the first measurement triad as compared to the output of the alignment of the second measurement triad.

4. The method of claim 3, wherein the rotation component determines a plurality of rotation calibration constants that modify the output of the second measurement triad to substantially align with the output of the first measurement triad.

5. The method of claim 1, wherein:
    the multiple-triad triaxial accelerometer comprises a first measurement triad comprising a first x component, a first y component, and a first z component and a second measurement triad comprising a second x component, a second y component, and a second z component; and
    the objective function comprises an alignment component that determines a plurality of misalignment calibration constants that modify the first x component, the first y component, and the first z component to be substantially orthogonal with respect to each other, and that modify the second x component, the second y component, and the second z component to be substantially orthogonal with respect to each other.

6. The method of claim 1, wherein receiving accelerometer output comprises receiving at least one of oscillation frequencies or periods of a plurality of sensor members associated with the multiple-triad triaxial accelerometer.

7. The method of claim 1, wherein determining initial approximations for each of the unknown calibration constants comprises using optimized calibration constants associated with a previously calibrated accelerometer.

8. The method of claim 1, wherein determining initial approximations for each of the unknown calibration constants comprises assuming each measurement triad is orthogonal and assuming each measurement triad is aligned with the other measurement triad.

9. The method of claim 1, wherein optimizing the objective function output comprises applying a linearized least squares optimization algorithm.

10. A system for calibrating a multiple-triad triaxial accelerometer, comprising:
    a controller operable to:
        store an objective function comprising one or more unknown calibration constants, wherein the objective function accounts for at least alignment and rotation;
        receive accelerometer measured output in at least as many distinct positions as there are unknown calibration constants;
        determine initial approximations for each of the unknown calibration constants;
        optimize output from the objective function, wherein alignment and rotation of at least two measurement triads are determined substantially simultaneously;
        extract optimized calibration constants resulting from the optimization; and
        store the optimized calibration constants associated with at least one calibration function in the controller.

11. The system of claim 10, wherein:
    the multiple-triad triaxial accelerometer comprises a first measurement triad and a second measurement triad; and
    the objective function comprises a first output vector associated with the output of the first measurement triad, a second output vector associated with the output of the second measurement triad, an average output vector associated with the average of the output of the first measurement triad and the second measurement triad, and a summed output vector associated with the sum of the output of the first measurement triad and the second measurement triad.

12. The system of claim 10, wherein:
the multiple-triad triaxial accelerometer comprises a first measurement triad and a second measurement triad; and
the objective function comprises a rotation component associated with the alignment of the output of the first measurement triad as compared to the alignment of the output of the second measurement triad.

13. The system of claim 12, wherein the rotation component determines a plurality of rotation calibration constants that modify the output of the second measurement triad to substantially align with the output of the first measurement triad.

14. The system of claim 10, wherein:
the multiple-triad triaxial accelerometer comprises a first measurement triad comprising a first x component, a first y component, and a first z component and a second measurement triad comprising a second x component, a second y component, and a second z component; and
the objective function comprises an alignment component that determines a plurality of misalignment calibration constants that modify the first x component, the first y component, and the first z component to be substantially orthogonal with respect to each other, and that modify the second x component, the second y component, and the second z component to be substantially orthogonal with respect to each other.

15. The system of claim 10, wherein the controller is further operable to receive accelerometer output comprising at least one of oscillation frequencies or periods of a plurality of sensor members associated with the multiple-triad triaxial accelerometer.

16. The system of claim 10, wherein the controller is further operable to determine the initial approximations for each of the unknown calibration constants using optimized calibration constants associated with a previously calibrated accelerometer.

17. The system of claim 10, wherein the controller is further operable to determine the initial approximations for each of the unknown calibration constants by assuming each measurement triad is orthogonal and assuming each measurement triad is aligned with the other measurement triad.

18. The system of claim 10, wherein the controller is further operable to optimize the objective function output by applying a linearized least squares optimization algorithm.

19. A method for calibrating a multiple-triad triaxial accelerometer comprising:
receiving accelerometer measured output from a first measurement triad and at least one additional measurement triad of the multiple-triad triaxial accelerometer;
aligning the output of a first x component, a first y component, and a first z component of the first measurement triad to be substantially orthogonal with respect to each other;
aligning the output of at least one additional x component, at least one additional y component, and at least one additional z component of the at least one additional measurement triad to be substantially orthogonal with respect to each other;
rotating the output of at least one of the first measurement triad and the at least one additional measurement triad so the outputs of all measurement triads substantially align with each other; and
storing the result of the alignment and rotation associated with at least one calibration function associated with the multiple-triad triaxial accelerometer;
wherein the alignment and rotation of at least two measurement triads are performed substantially simultaneously.

20. The method of claim 19, further comprising applying the accelerometer measured output to at least one objective function, wherein the at least one objective function substantially simultaneously performs the alignment and rotation.

\* \* \* \* \*